(12) United States Patent
Scott

(10) Patent No.: US 9,242,662 B2
(45) Date of Patent: Jan. 26, 2016

(54) GARBAGE MOVING DOLLY AND UNLOADING SYSTEM

(76) Inventor: Charles Shay Scott, Early, TX (US)

( * ) Notice: Subject to any disclaimer, the term of this patent is extended or adjusted under 35 U.S.C. 154(b) by 836 days.

(21) Appl. No.: 13/355,005

(22) Filed: Jan. 20, 2012

(65) Prior Publication Data

US 2012/0207571 A1    Aug. 16, 2012

(51) Int. Cl.
*B62B 1/14* (2006.01)
*B62B 1/16* (2006.01)
*B65G 65/23* (2006.01)
*B62B 1/06* (2006.01)

(52) U.S. Cl.
CPC ... *B62B 1/14* (2013.01); *B62B 1/06* (2013.01); *B62B 1/16* (2013.01); *B65G 65/23* (2013.01); *B62B 2202/20* (2013.01); *B62B 2203/10* (2013.01); *B62B 2203/70* (2013.01)

(58) Field of Classification Search
CPC ............ B62B 1/06; B62B 1/16; B65G 65/23; B66F 9/19
USPC ......... 414/420, 422, 424, 425, 444, 457, 490, 414/598
See application file for complete search history.

(56) References Cited

U.S. PATENT DOCUMENTS

| | | | | | |
|---|---|---|---|---|---|
| 486,717 | A | * | 11/1892 | Karr | 414/598 |
| 1,041,020 | A | * | 10/1912 | Carstens | 187/241 |
| 1,067,181 | A | * | 7/1913 | Levalley | 414/598 |
| 1,956,650 | A | * | 5/1934 | Milner | 414/598 |
| 3,868,033 | A | * | 2/1975 | Le Duff | 414/648 |
| 4,911,600 | A | | 3/1990 | Zelinka et al. | |
| 5,372,470 | A | | 12/1994 | Wilke et al. | |
| 5,406,996 | A | * | 4/1995 | Wagner et al. | 141/364 |
| 5,425,614 | A | * | 6/1995 | Perussi et al. | 414/422 |
| 5,489,182 | A | * | 2/1996 | Habicht | 414/420 |
| 5,582,500 | A | * | 12/1996 | Morris | 414/422 |
| 5,735,663 | A | * | 4/1998 | Zachhuber | 414/338 |

(Continued)

FOREIGN PATENT DOCUMENTS

| | | | | | |
|---|---|---|---|---|---|
| JP | | 05254442 A | * | 10/1993 | 414/490 |
| WO | WO 2013/186446 A1 | | * | 12/2013 | B65F 1/14 |

OTHER PUBLICATIONS

"Simplicity Plus Bin Lifter / Bin Tipper" Downloaded from www.mrwheeliebin.com.au/simplicity-plus-bin-lifter.html on Nov. 17, 2011, pp. 1-4.

(Continued)

*Primary Examiner* — James Keenan
(74) *Attorney, Agent, or Firm* — Meyertons, Hood, Kivlin, Kowert & Goetzel, P.C.; Eric B. Meyertons

(57) ABSTRACT

A dolly system for moving and disposing of garbage includes a frame assembly, and a holder assembly coupled to the frame assembly. The frame assembly may include a pair of rails. The frame assembly can rest on a surface (for example, on wheels for the frame assembly.) The frame assembly can be declined (for example, tilted back wheels). The holder assembly includes a carriage and a holder coupled to the carriage. The holder can hold a garbage container. When the frame assembly is declined, the rails of the frame assembly may form a ramp for the holder assembly. The carriage of the holder assembly can slide up and down on the rails of the frame assembly. The holder is movable relative to the carriage (for example, by tipping the holder) to empty contents out of the garbage container when the carriage is in a raised position on the ramp.

9 Claims, 6 Drawing Sheets

(56) References Cited

U.S. PATENT DOCUMENTS

| | | | |
|---|---|---|---|
| 5,967,362 A | 10/1999 | Corbin | |
| 6,113,340 A * | 9/2000 | Zalal | 414/598 |
| 6,379,099 B1 | 4/2002 | Novak | |
| 6,474,929 B1 * | 11/2002 | Hartman | 414/422 |
| 6,503,045 B2 | 1/2003 | Arrez et al. | |
| 6,644,907 B1 * | 11/2003 | Pinder | 414/424 |
| 7,018,155 B1 | 3/2006 | Heberling et al. | |
| 7,128,515 B2 | 10/2006 | Arrez et al. | |

OTHER PUBLICATIONS

"Dumping Machine" Downloaded from www.trashmanmfg.com/TrashDumpingMachine.cfm on Nov. 17, 2011, copyright 2008, p. 1.

"The Hand Operated Bin-lifter" Downloaded from www.castorsandindustrial.com.au/cgeneral/liftmaster/lm_simplicity.htm on Nov. 17, 2011, p. 1.

"Backsaver 300 in Action! Features" Downloaded from www.backsaver300.com/features on Nov. 17, 2011, pp. 1-2.

* cited by examiner

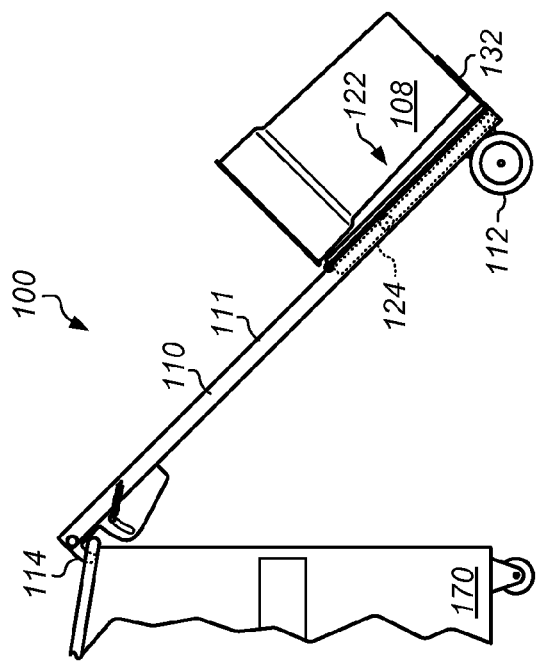
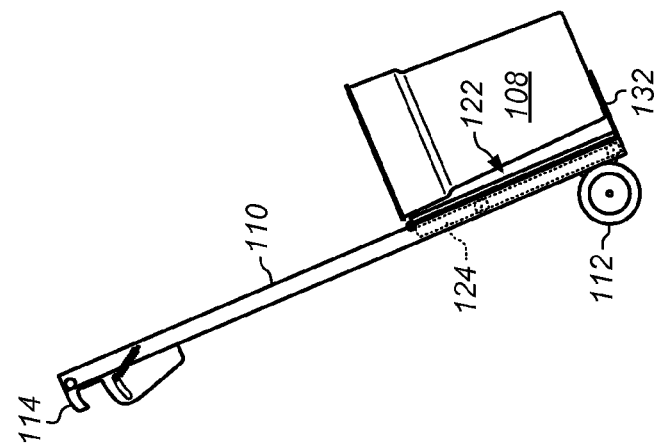
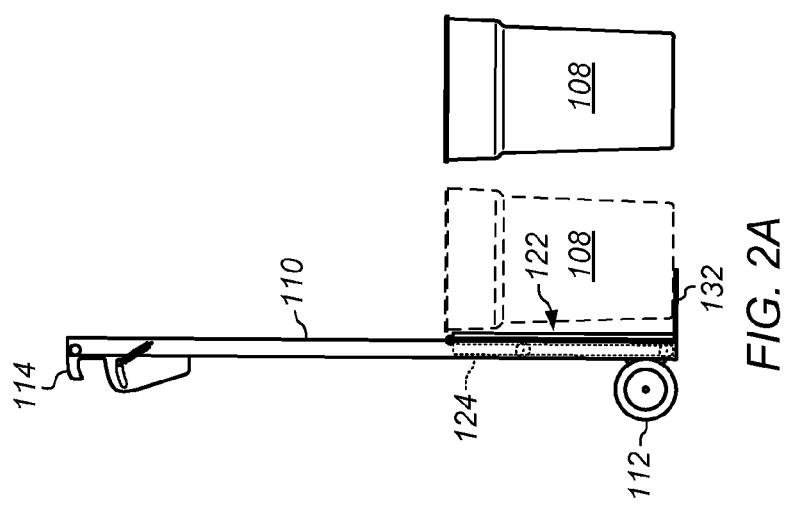

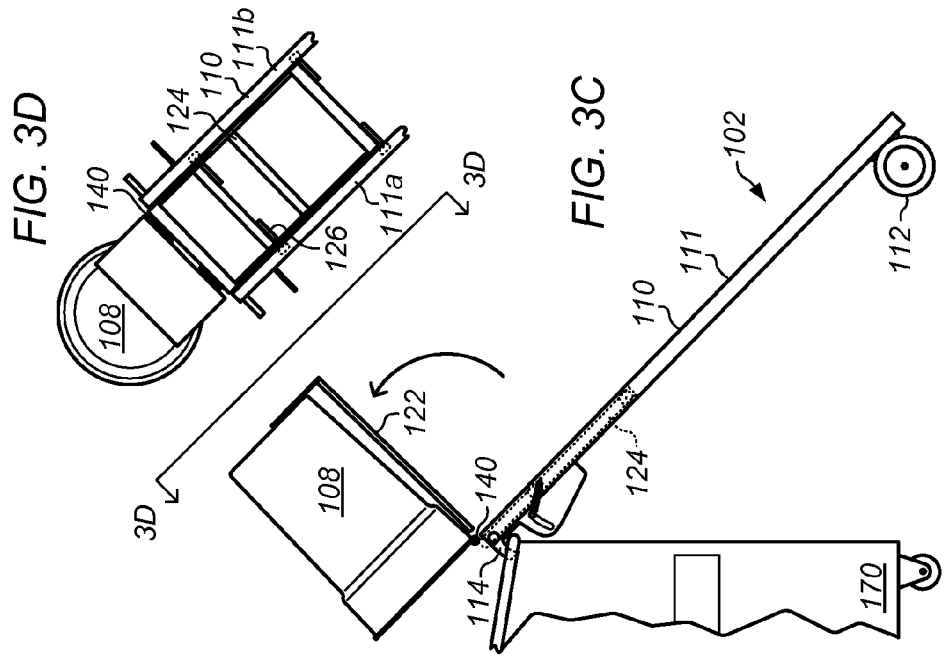
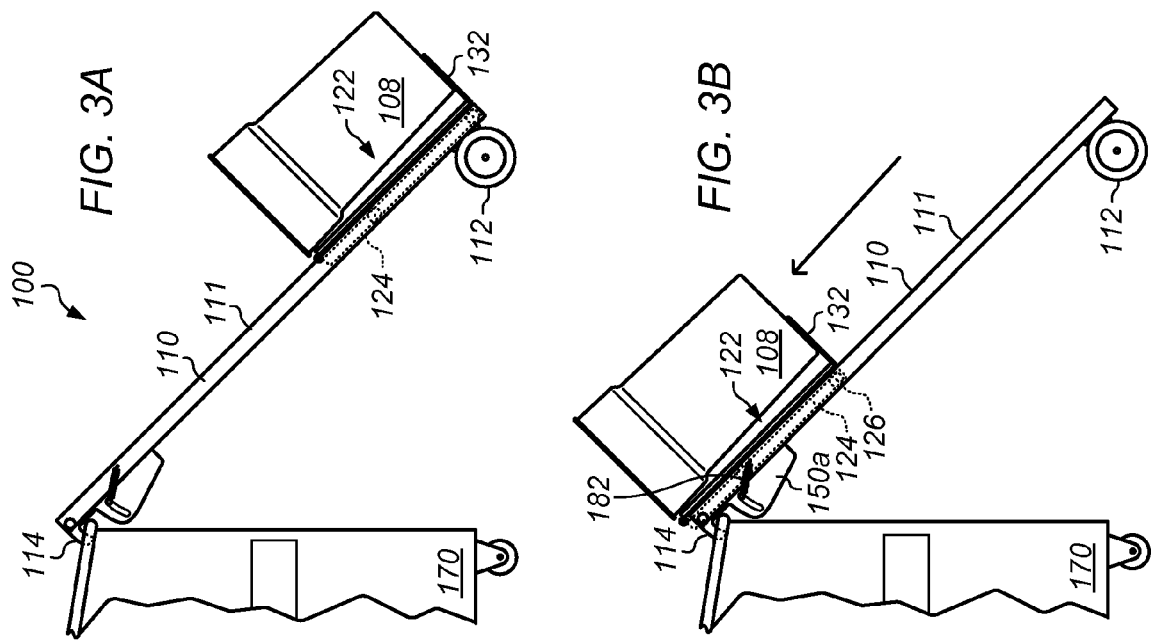

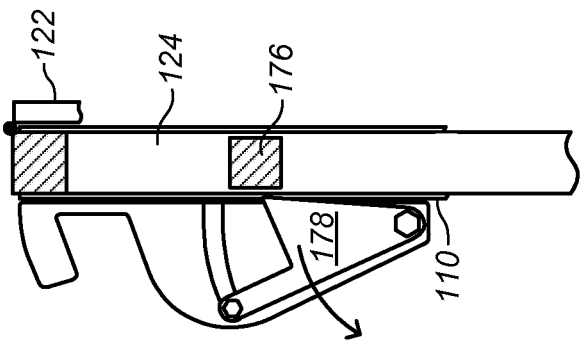
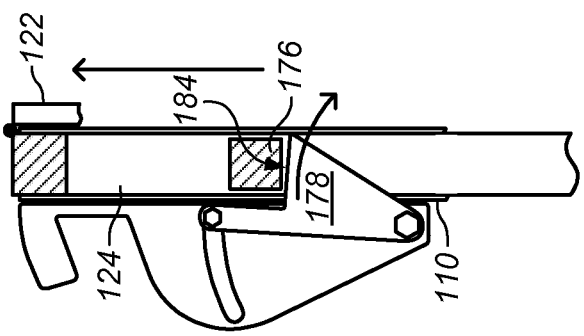
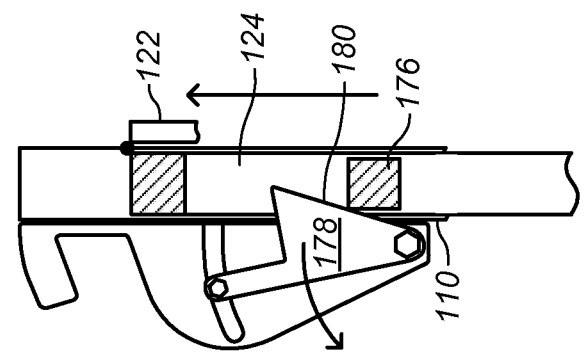
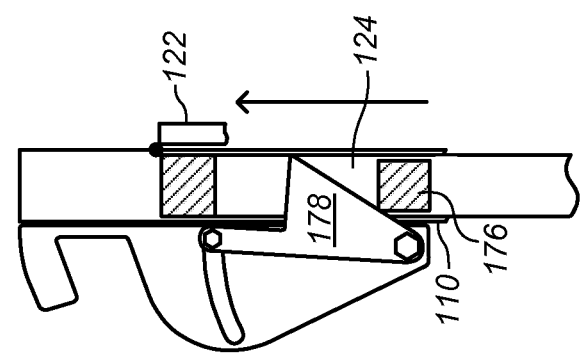

GARBAGE MOVING DOLLY AND UNLOADING SYSTEM

BACKGROUND

1. Field

The present invention relates generally to systems, devices, and methods for moving and disposing of garbage. More particularly, the present disclosure relates to a dolly system for moving garbage in a garbage container and unloading the garbage from the garbage container.

2. Description of the Related Art

In many industrial, commercial, and residential settings, significant amounts of trash and garbage need to be disposed of. Garbage is often first loaded into relatively small containers, emptied into successively larger containers, and then transferred to a receiving container or platform, such as a dumpster, garbage-hauling vehicle, or trailer.

In many cases, the opening for a dumpster or vehicle to receive the garbage is many feet above the ground. For example, a dumpster may be in the form of a large open box with sides several feet high. Similarly, the bed of flat-bed truck to receive a load of garbage may be several feet off the ground. Moving garbage to the receiving container and unloading the contents may be labor-intensive and difficult. Also, the lifting of the containers may be increase risk of injury by the personnel performing disposal.

SUMMARY

Embodiments of systems, devices, and methods for moving and unloading material, such as garbage, are described herein. In an embodiment, a dolly system for moving and disposing of garbage includes a frame assembly, and a holder assembly coupled to the frame assembly. The frame assembly may include a pair of rails. The frame assembly can rest on a surface (for example, on wheels for the frame assembly.) The frame assembly can be declined (for example, by tiling the frame assembly back on wheels). The holder assembly includes a carriage and a holder coupled to the carriage. The holder can hold a garbage container. When the frame assembly is declined, the rails of the frame assembly may form a ramp for the holder assembly. The carriage of the holder assembly can slide up and down on the rails of the frame assembly. The holder is movable relative to the carriage (for example, by tipping the holder relative to the carriage) to empty contents out of the garbage container when the carriage is in a raised position on the ramp. By sliding the garbage container up the ramp and tipping the holder assembly in a raised position on the frame assembly, a managed lift and unloading of the garbage container may be achieved.

In an embodiment, a method of moving and disposing of garbage includes placing a garbage container on a holder and declining the holder. The holder may be translated from a lower position to a higher position while the holder is declined. The holder may be moved such that contents of the garbage container are dumped out of the garbage container.

A system for moving and disposing of garbage includes a frame assembly, a holder assembly coupled to the frame, and one or more latch mechanisms. The holder assembly includes a carriage and a holder coupled to the carriage. The carriage can translate on the frame from a lower position to a higher position. The holder can hold a garbage container. The holder is movable relative to the carriage to empty contents out of the garbage container when the carriage is at the higher position. The latch mechanisms can latch the carriage to maintain the carriage in the higher position (for example, during unloading of the container).

BRIEF DESCRIPTION OF THE DRAWINGS

FIG. 2A illustrates one embodiment of a material unloading system resting on a horizontal surface.

FIG. 2B illustrates one embodiment of a material unloading system in a declined state.

FIG. 2C illustrates one embodiment of a material unloading system engaged on a dumpster.

FIG. 3A illustrates a container on a material unloading system resting against a dumpster.

FIG. 3B illustrates a holder assembly latched in a raised position on a frame of the material unloading system.

FIG. 3C illustrates tipping of a container in a raised position on a material unloading system.

FIG. 3D illustrates an orthographic view of a material loading system during unloading.

FIG. 6A illustrates one embodiment of a carriage that has not yet reached its upper position on a frame.

FIG. 6B illustrates a cross member of a carriage that has displaced a latch member.

FIG. 6C illustrates one embodiment of a carriage for a material handling system in a latched position.

FIG. 6D illustrates one embodiment of a latch mechanism in which a latch member is in a retracted position.

Figure 1:
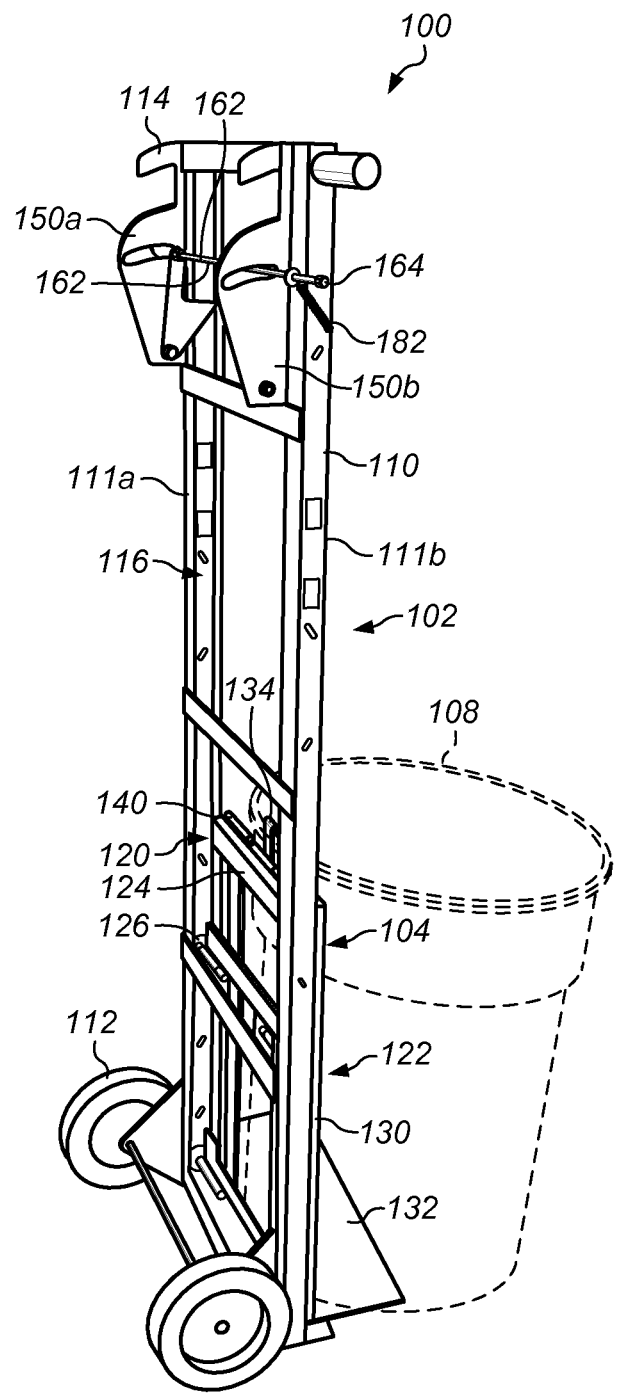
FIG. 1 illustrates one embodiment of a system for moving and disposing of garbage.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, "container" means any element or combination of elements that can hold material. Examples of containers include bins, boxes, cans, crates, bags, and dumpsters.

As used herein, "declined" means at an angle relative to vertical.

As used herein, "dolly system" includes any system, apparatus, element, or combination of thereof that can be used to transport one or more items from one location to another location.

As used herein, to "dump" means to empty, pour out, discharge, discard, dump, drop, or remove at least a portion the contents of a container.

As used herein, a "frame" means any element or combination of elements on which one or more other elements can be mounted.

As used herein, "higher" means higher in elevation. A location that is higher than another location may or may not be directly above the other location.

As used herein, "holder" means any element or combination of elements that can at least partially hold another element.

As used herein, "latch mechanism" includes any mechanism that holds an element in place relative to one or more other elements until any action is taken to release the latch mechanism.

As used herein, to "raise" means to increase in elevation. An element may be raised from one location relative to ground or floor to a higher location. For example, a holder for a garbage container may be raised from a location 2 inches above the ground to a location 60 inches above the ground.

As used herein, a "roller" means any element that can roll on a surface, such as a wheel.

As used herein, to "translate" means in to move in a linear motion.

Systems and methods are disclosed herein for moving and unloading material. In an embodiment, a system for moving and disposing of material includes a frame assembly and holder assembly that can be moved up on tracks of the frame assembly. The holder assembly may hold a container, such as a garbage bin. The frame assembly may have wheels for moving material in the container from one location to another. When the container is in a desired location, the holder assembly may be raised on the tracks to an elevated position. In the elevated position, the holder may be tipped relative to the frame to empty contents from the container.

FIG. 1. illustrates one embodiment of a system for moving and disposing of material, such as garbage. Material unloading system 100 includes frame assembly 102 and holder assembly 104. Holder assembly 104 may be moved up and down on frame assembly 102. Holder assembly 104 may hold container 108.

Frame assembly 102 includes frame 110, wheels 112, and hooks 114. Wheels 112 may allow material unloading system 100 to be rolled from one location to another on a horizontal surface, such as the ground or a floor. Hooks 114 may be used to engage a container or platform for receiving the contents of container 108. Frame 110 includes left rail 111*a* and right rail 111*b*. Left rail 111*a* and right rail 111*b* include channels 116.

In the embodiment shown in FIG. 1, the system for moving and disposing of material has only two wheels. A dolly system may, nevertheless in various embodiments include any number of wheels.

Holder assembly 104 includes carriage assembly 120 and holder 122. Carriage assembly 120 includes carriage frame 124 and rollers 126. Channels 116 of rails 111*a* and 111*b* may serve as tracks for rollers 126. Rollers 126 may roll within channels 116 of frame 110 as carriage frame 124 is moved up and down on frame 110.

Holder 122 includes holder frame 130, holder base 132, and clip device 134. Holder 130 is coupled to carriage frame 132 by way of hinges 140.

Material unloading system 100 includes left latch mechanism 150*a* and right latch mechanism 150*b*. Left latch mechanism 150*a* and right latch mechanism 150*b* may automatically latch holder assembly 104 in a raised position on frame 110 of frame assembly 102.

Release bar 160 may be commonly coupled to left latch mechanism 150*a* and right latch mechanism 150*b*. Release bar 160 includes cross member 162 and handles 164. Either of handles 164 may be operated to simultaneously release left latch mechanism 150*a* and right latch mechanism 150*b*.

Components of material unloading system 100, such as frame 110, carriage frame 124, and holder 122 may be made of any suitable material. Examples of materials for frame 110, carriage frame 124, and holder 122 include steel, aluminum, a composite material, a polymeric material such as polyvinyl chloride ("PVC"), or combinations of such materials.

In some embodiments, a device for unloading material also serves a dolly for moving the material from one location to another. FIGS. 2A through 2C illustrate one embodiment of rolling a container to a receiving platform using a material unloading device. In FIG. 2A, material unloading system 100 rests holds container 108 in a stable position on holder base 132 of holder 122. In FIG. 2B, material unloading system 100 is tipped back on wheels 112 of frame assembly 102 to allow container 108 to be rolled to an unloading location. In FIG. 2C, hooks 114 of material unloading system 100 are dropped onto the edge of dumpster 170.

FIG. 3A through 3C illustrate one embodiment of unloading material from a container using a material unloading system. FIG. 3A illustrates a container on a material unloading system resting against a dumpster. In FIG. 3A, holder assembly 120 is at the bottom of frame 110. Frame 110 is declined from vertical. In some embodiments, hooks 114 engage on dumpster 122. Holder assembly 120 may be raised on frame 110 by manually raising carriage assembly 120 up frame 110. Rollers 126 of carriage assembly 120 may roll up frame 110 within channels 116 of frame assembly 102. In some embodiments, carriage assembly 120 translates on frame 110. Holder assembly 104 may continue to be raised until carriage frame engages in left latch mechanism 150*a* and right latch mechanism 150*b*. FIG. 3B illustrates a holder assembly latched in a raised position on a frame of the material unloading system.

When the frame assembly is declined, rails 111 of the frame assembly 110 may form a ramp for holder assembly 120. The carriage of the holder assembly can slide up and down on the rails of the frame assembly. The ramp formed by rails 111 may provide a mechanical advantage for managing and lifting garbage container 108. For example, by moving garbage container 108 up the ramp, locking holder assembly 120 in a raised position on frame 110, and tipping holder assembly 120 with holder assembly 120 in the raised position on frame 110, a managed lift and unloading of garbage container 108 may be achieved.

Once holder assembly 104 has been raised to a latched position on frame 110, holder 122 may be swung out on hinges 140 such that container 108 is tipped. FIG. 3C illustrates tipping of a container in a raised position on a material unloading system. Holder 122 may rotate on hinges 140 away from carriage frame 124. Holder 122 may continue to be rotated until the contents of container 108 are dumped into dumpster 170.

FIG. 3D illustrates an orthographic view of a material loading system during unloading, taken along lines 3D-3D shown in FIG. 3C. Carriage frame 124 may be latched in left latch mechanism 150*a* and right latch mechanism 150 to be held in a raised position on frame 110 of frame assembly 102.

Once the contents of container 108 have been dumped from container 108, holder 122 may be swung back down to a resting position on carriage frame 124. Hooks 114 may be disengaged from dumpster 170. Frame assembly 102 may be returned to a vertical orientation. One of handles 164 may be operated to release left latch mechanisms 150a and right latch mechanisms 150b. Once left latch mechanisms 150a and right latch mechanisms 150b have been released, carriage frame 124 may be lowered on frame 110 to return holder assembly 120 to a lowered position (such as the lower position shown in FIG. 3A).

Figure 4:
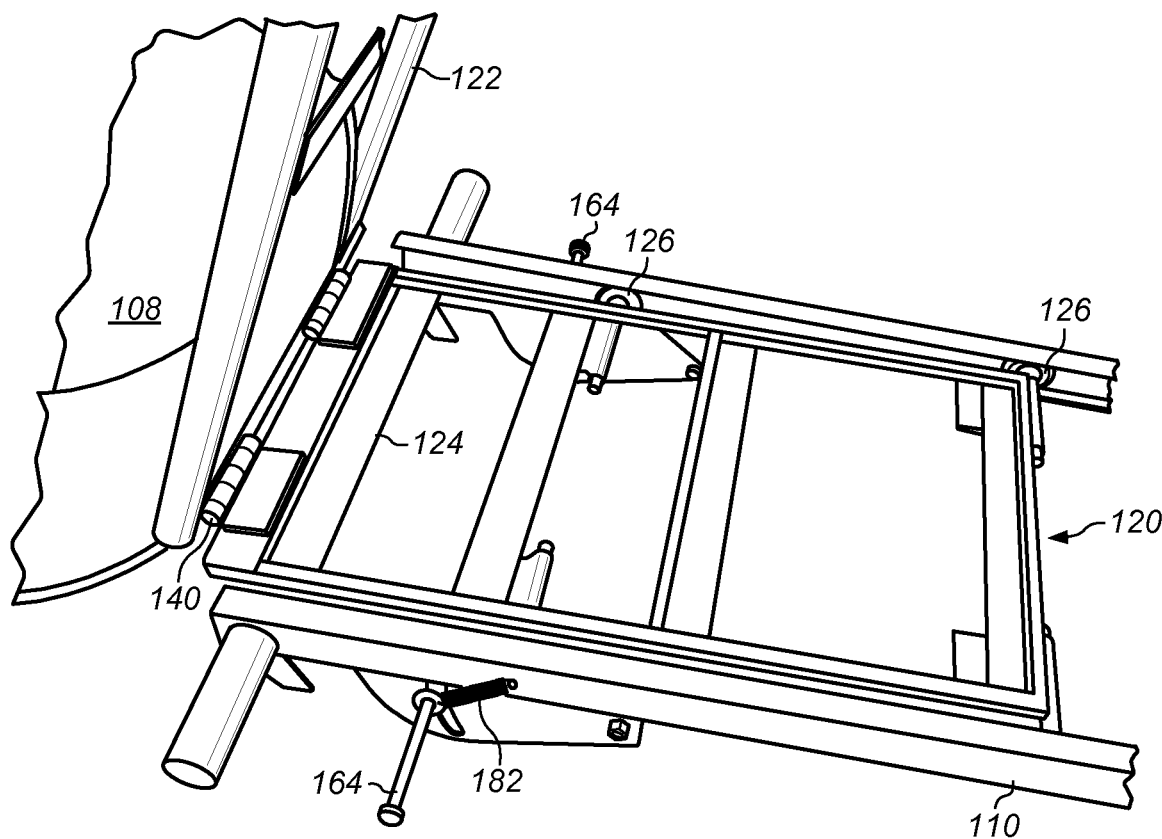
FIG. 4 illustrates one embodiment of a holder assembly with a holder swung away from a carriage frame for tipping of a container.

FIG. 4 illustrates one embodiment of a holder assembly with a holder swung away from a carriage frame to tip a container. Carriage frame 124 may be latched in left latch mechanism 150a and right latch mechanism 150b during tipping of the container.

Figure 5:
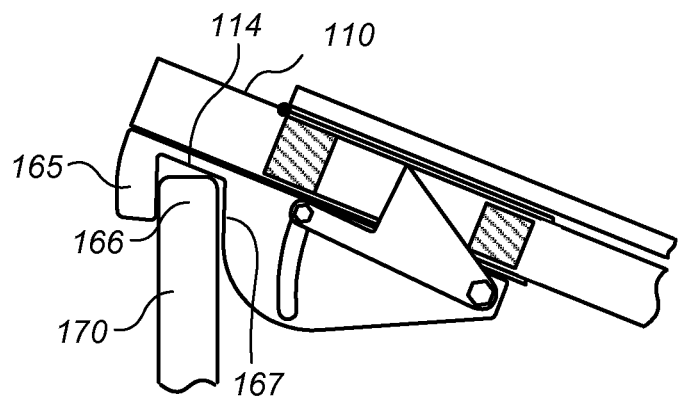
FIG. 5 illustrates one embodiment of engagement of a dolly system engaged on the lip of a garbage dumpster.

FIG. 5 illustrates one embodiment of engagement of a dolly system on a lip of a garbage dumpster. Frame assembly 110 may engage on lip 166 of dumpster 170. Engagement of frame assembly 110 on lip 167 may inhibit movement of the dolly system during use of the dolly system to empty contents of the garbage container into the dumpster. For example, hook member 166 may bear against the interior wall of dumpster 170 to inhibit frame assembly 110 from sliding away from the dumpster during use of the dolly system. Stop member 167 may bear against an exterior wall of the dumpster to inhibit frame assembly 110 from sliding up on dumpster 170 during use of the dolly system. The angle of the surfaces of hook member 166 and stop member 167 may align with the mating walls of the when the system 10 is engaged on dumpster 170. For example, as shown in FIG. 5, the bearing surfaces of hook member 166 and stop member 167 may be match the vertical side walls of In some embodiments, a holder assembly is automatically latched in a raised position for unloading material from a container. FIGS. 6A through 6D illustrate operation of a latch mechanism for a carriage of a material unloading system according to one embodiment. (For illustrative purposes, the frame is shown in the upright position in each of FIGS. 6A-6D, though the frame may be inclined during use of the system.) Initially, cross member 176 of carriage frame 124 is below latch member 178. FIG. 6A illustrates one embodiment of a carriage that has not yet reached its upper position on a frame. As carriage frame 124 is moved up on frame 110, cross member 176 may slide upwardly across tapered edge 180 of latch member 178. Cross member 176 may bear against latch member 178 and displace latch member 178 against the resilient biasing force of latch spring 182. FIG. 6B illustrates a cross member of a carriage that has displaced a latch member from the latch member's forwardly biased position.

Once cross member 176 clears the top of tapered edge 180 of latch member 178, the biasing force of latch spring 182 may return latch member 178 to a forward position, latching carriage frame 124 in a raised position. Cross member 176 of carriage frame 124 may rest on shelf portion 184 of latch member 178. FIG. 6C illustrates one embodiment of a carriage for a material handling system in a latched position. With the carriage latched in a raised position, the holder may be swung outwardly to tip the container and empty the contents of the container.

To return carriage frame 124 to a lowered position, an operator may pull back on one of handles 164 to draw latch member 178 out of engagement with cross member 176. With latch member 178 in a retracted position, carriage frame 124 may be lowered to the base of frame 110. FIG. 6D illustrates one embodiment of a latch member in a retracted position.

In some embodiments, a material unloading system includes elements for retaining a container in place. In one embodiment, a container retention device inhibits a container from falling off or separating from a holder. Examples of devices that can be used as retaining devices for a container include jaws, straps, pins, and hooks. In one embodiment, a material unloading system includes a clip device. For example, clip device 134 shown in FIG. 1 may inhibit container 108 from separating from holder 122 while container 108 is being moved and unloaded.

Figure 7:
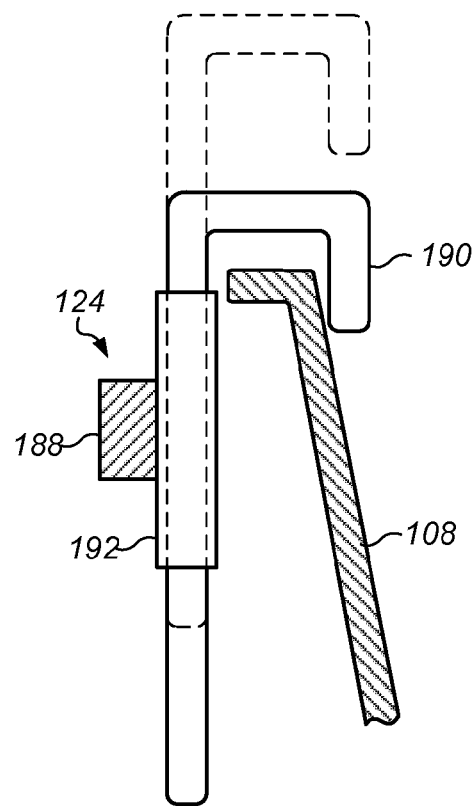
FIG. 7 is a side view illustrating a clip device that can be positioned to engage a container.

FIG. 7 is a side view illustrating a clip device that can be positioned to engage a container. Clip device 134 includes slide clip 190 and sleeve 192. Sleeve 192 is coupled (for example, welded or bolted) to upper cross member 188 of carriage frame 124. Slide clip 190 may slide up and down in sleeve 192. To hold container 108 in place on holder 122, slide clip 190 may be slid down such that a portion of the clip bears against the inside wall of container 108. To withdraw slide clip 190 from engagement with container 108, slide clip 190 raised to the level shown in phantom lines in FIG. 6.

In some embodiments, a system includes a drive mechanism for raising a container on a dolly system. In certain embodiments, the drive mechanism is used for powered raising and/or lowering of the garbage container. Examples of drive mechanisms that may be used to raise or lower a container include a chain drive, cable drive, power screw mechanism, or linear actuator. In some embodiments, an electric motor is used to power one or more drive mechanisms for a dolly system.

In some embodiments, a system includes a drive mechanism for dumping or tipping a container on a dolly system. In certain embodiments, the drive mechanism is used for powered tipping or dumping of the garbage container. Examples of drive mechanisms that may be used to dump or tip a container include a rotary actuator, a hydraulic cylinder, or a pneumatic cylinder.

Figure 8:
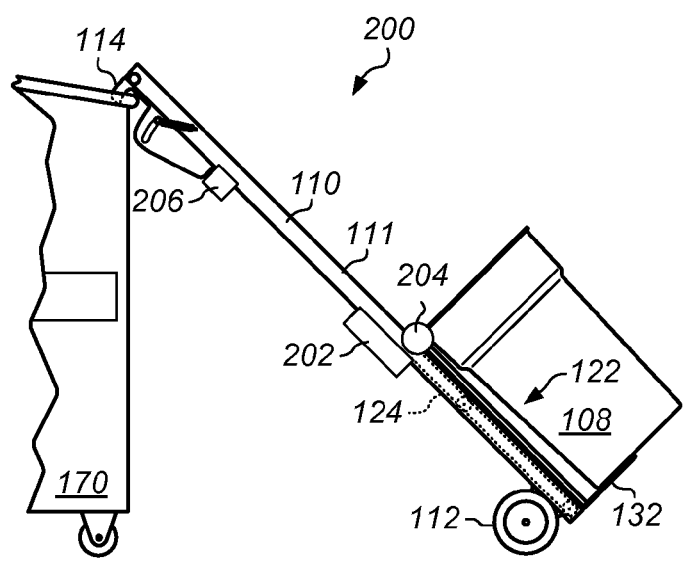
FIG. 8 is a schematic diagram illustrating one embodiment of a system including a container raising drive mechanism and a garbage container tipping drive mechanism.

FIG. 8 is a schematic diagram illustrating one embodiment of a system including a container raising drive mechanism and a garbage container tipping drive mechanism. Dolly system 200 includes container raising drive mechanism 202, container tipping drive mechanism 204, and control system 206. Container raising drive mechanism 202 may be operable to raise and lower carriage 124 on inclined rails 111. Container tipping drive mechanism 204 may be operable to tip holder 122 with respect to carriage 124 to empty the contents of garbage container 108.

Control system 206 may include a programmable logic controller. Control system 206 may be operable to control container raising drive mechanism 202, container tipping drive mechanism 204, or both.

In certain embodiments, a system includes an electric motor and battery for powering the electric motor. The electric motor may be used to drive mechanisms, such as container raising drive mechanism 202 or container tipping drive mechanism 204. In some embodiments, an electric motor for a drive system uses a rechargeable battery. In certain embodiments, a drive mechanism for raising or tipping a container includes a coupling device for a power tool, such as a power drill. For example, a power drill with a hex driver attachment may be engaged in a socket drive mechanism in container raising drive mechanism 202 or container tipping drive mechanism 204. The power drill may be operated to raise, lower, or tip a garbage container.

In various embodiments described above, a system is described for use in unloading garbage into a dumpster. Systems as described herein may, nevertheless, may in various embodiments be used to empty any material into any receiving container or onto a platform.

Although in various embodiments described above, container 108 is shown as having a generally cylindrical, tapered shape, material unloading systems as described herein may move and unload containers of any shape and size. Examples of cross sections of containers may include square, rectangular, ovate, and irregular. A container may have a lid or no lid. In certain embodiments, a container has its own set of wheels.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of moving and disposing of garbage, comprising:
    placing a garbage container on a container holder while the container holder is coupled to a carriage on a wheeled frame assembly of a dolly system, the frame assembly having a frame in a vertically upright position and a set of wheels coupled to the frame;
    manually declining the frame assembly from the vertically upright position to a declined position while the frame assembly rests by the wheels on a ground surface and while the container is supported on the container holder;
    rolling, while the frame assembly is manually declined from the vertically upright position, the frame assembly to a location on the ground surface that is next to a dumpster;
    leaning the frame assembly against the dumpster such that an engaging portion of the frame assembly rests on a lip of the dumpster and such that a portion of the frame assembly spans, at an incline, between the engaging portion resting on the lip of the dumpster at one end of the inclined frame assembly and the wheels on the ground surface at the other end of the inclined frame assembly such that the weight of the dolly system and the container is distributed between the lip of the dumpster and the wheels on the ground surface;
    translating the carriage and the container holder from a lower position to a higher position on the frame assembly while the frame assembly is leaned against the dumpster and in the declined position from the vertically upright position and the container is held on the container holder and while the frame assembly is spanning between the engaging portion on the lip of the dumpster and the wheels on the ground surface, wherein the frame assembly is leaned against the dumpster such that the container on the carriage is tilted back relative to its loading orientation when the container is translated from the lower position to the higher position on the frame assembly;
    latching, while the frame assembly is leaned against the dumpster, the carriage relative to the frame assembly while the carriage and the container holder are in the higher position;
    swinging, while the frame assembly is leaned against the dumpster, the container holder upwardly about a hinge connection relative to the carriage while the frame assembly is in the declined position from the vertically upright position and while the carriage is held by the latch mechanism in the higher position to tilt the garbage container forward to empty at least a portion of contents out of the garbage container into the dumpster while the carriage is at the higher position.

2. The method of claim 1 further comprising engaging the engaging portion of the frame assembly on the lip of the dumpster to inhibit movement of the dolly system during use of the dolly system to empty contents of the garbage container into the dumpster, wherein engaging the dumpster-engaging portion comprises rolling the wheels closer to or farther away from the dumpster until the dumpster-engaging portion rests on the lip of the dumpster while the contents of the garbage container are emptied into the dumpster.

3. The method of claim 2, wherein engaging the dumpster-engaging portion comprises engaging a hook member to bear against an interior wall of the dumpster to inhibit the frame assembly from moving away from the dumpster during use of the dolly system to empty contents of the garbage container into the dumpster.

4. The method of claim 1, wherein latching the carriage relative to the frame assembly comprises automatically latching the carriage when the carriage is moved to a predetermined raised position relative to the frame assembly.

5. The method of claim 1, further comprising clipping the container to the frame assembly, to inhibit separation of the garbage container from the holder.

6. The method of claim 5, wherein clipping the container comprises at least partially inserting a clip attached to the frame assembly into an opening in the garbage container.

7. The method of claim 1, wherein at least a portion of the contents dumped from the garbage container is trash.

8. The method of claim 1, further comprising rolling the garbage container from one location to another location after placing the container on the container holder and before the at least a portion of the contents are dumped out of the garbage container.

9. The method of claim 1, further comprising clipping the garbage container to the container holder before translating the container holder from the lower position to the higher position.

* * * * *